United States Patent [19]

Setty et al.

[11] 3,963,838

[45] June 15, 1976

[54] METHOD OF OPERATING A QUARTZ FLUIDIZED BED REACTOR FOR THE PRODUCTION OF SILICON

[75] Inventors: H. S. N. Setty; Carl L. Yaws, both of Dallas; Bobby Ray Martin, Plano; Daniel Joseph Wangler, Irving, all of Tex.

[73] Assignee: Texas Instruments Incorporated, Dallas, Tex.

[22] Filed: May 24, 1974

[21] Appl. No.: 473,033

[52] U.S. Cl............................ 427/213; 264/30; 423/349; 423/350; 427/215; 427/235; 427/255; 427/374; 427/377; 427/379
[51] Int. Cl.².................................... B05D 7/00
[58] Field of Search....... 117/DIG. 6, 100 S, 106 A; 423/349, 350; 264/30; 427/213, 215, 235, 255, 374, 377, 379

[56] References Cited
UNITED STATES PATENTS

| | | | |
|---|---|---|---|
| 3,012,861 | 12/1961 | Ling | 117/100 B |
| 3,012,862 | 12/1961 | Bertrand et al. | 117/106 A |
| 3,016,291 | 1/1962 | Aries | 423/350 |

*Primary Examiner*—Ronald H. Smith
*Assistant Examiner*—Dennis C. Konopacki
*Attorney, Agent, or Firm*—Harold Levine; James T. Comfort; Gary C. Honeycutt

[57] ABSTRACT

In order to prevent breakage of a quartz fluidized bed reactor utilized in the production of silicon, the reactor is cooled as soon as a thin layer of silicon is formed on the reactor walls and then reheated to continue silicon growth. In this manner, the thin layer of silicon shatters and forms a weak foundation for subsequent silicon deposition on the reactor wall when the silicon deposition is continued. Subsequently deposited silicon on the walls continuously peels off without breaking the reactor.

3 Claims, 1 Drawing Figure

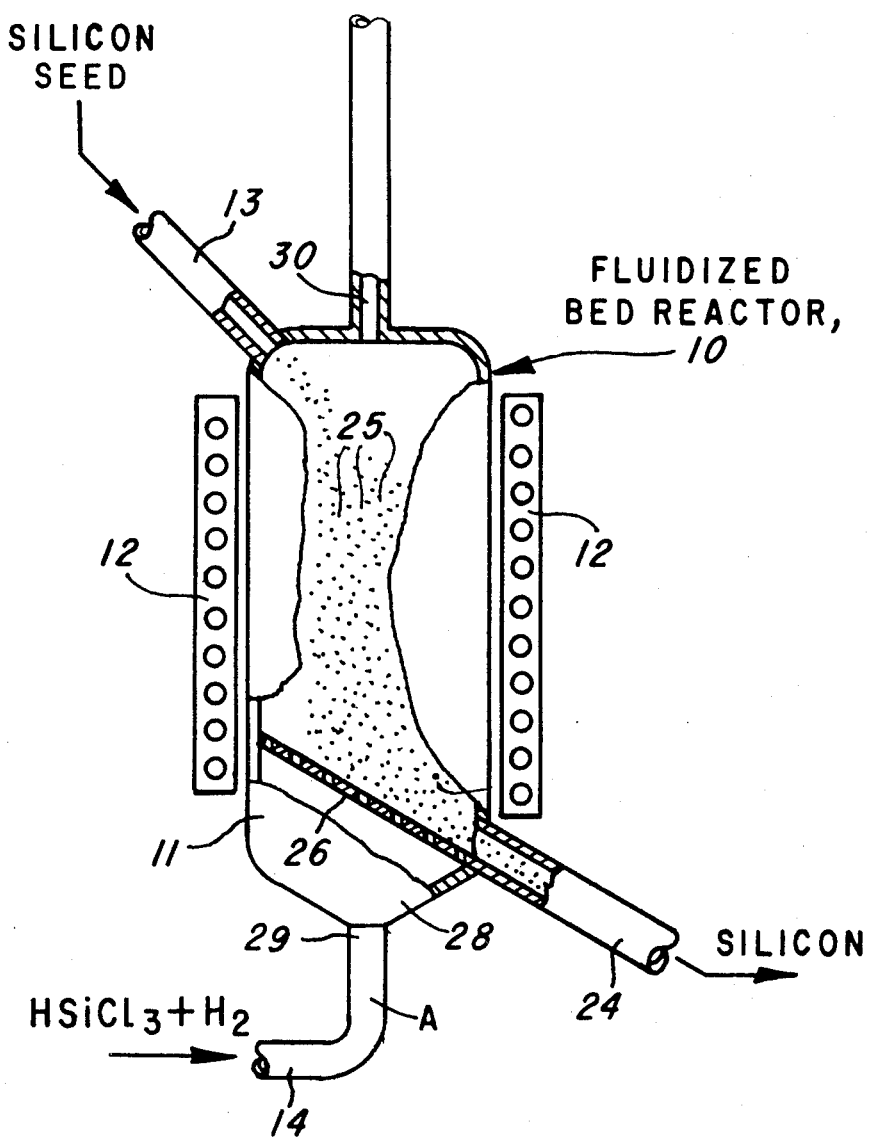

METHOD OF OPERATING A QUARTZ FLUIDIZED BED REACTOR FOR THE PRODUCTION OF SILICON

This invention relates to a method of operating deposition reactors, and more particularly to a method of operating a reactor for the production of material where there is a relatively large difference between the coefficient of thermal expansion between such deposited material and the reactor wall material.

Quartz fluidized bed reactors have been utilized for the production of silicon material. Such fluidized bed reactors have been described, for example, in U.S. Pat. Nos. 3,012,861 and 3,012,862. The quartz or silica reactor material is corrosion resistant and is non-reactive toward the reactants and reaction products. One of the major advantages of the fluidized bed reactor is its ability to be utilized in a continuous or semicontinuous mode. However, the present methods of operating quartz reactors have been found unsuitable in the operation of a quartz fluidized bed reactor.

The heat necessary to maintain the silicon bed at operating temperatures of 850°–1350° C is furnished through the reactor walls by the surrounding heater coils (resistant heater coils or RF coils). In this mode of heat transfer, silicon is also deposited on the walls of the quartz reactor and grows in thickness with operating time. Because of the enormous difference that exists in the coefficient of thermal expansion between silicon and quartz, the reactor becomes extremely susceptible to even slight thermal shock resulting in reactor breakage. This result prevents quartz fluidized bed technology from being an economical process in the production of silicon and completely defeats its potential continuous or semi-continuous operability.

In prior processes for operating a quartz reactor, the quartz reactor tube is installed and checked for leaks. The reactor is purged with argon and maintained with argon while the reactor is heated to deposition temperature. When the reactor has reached deposition temperature (950°–1250° C), the feed gas stream is gradually changed over from argon to the reactant gases. Deposition begins and the reactor is left in the deposition mode for a predetermined time or until the reactor breaks. Even if the reactor operates for the full length of time desired, the quartz reactor tube usually breaks in the cooling down process. In either instance, the breakage of the quartz reactor tube is due to the difference between the thermal expansion of the quartz in relation to the thermal expansion of the thick growth of silicon on the walls.

It is therefore an object of the present invention to provide a method of operating a reactor for the growth of a material where there is a relatively large difference between the coefficient of thermal expansion of such material and the reactor wall material. Another object of the invention is to provide such method for a fluidized bed reactor. A further object of the invention is to provide a method for operating a quartz-comprising reactor for the production of silicon which prevents breakage of the quartz-reactor due to thermal shock. A still further object of the invention is to provide such method for a quartz wall fluidized bed reactor.

These and other objects of the invention are accomplished by including in the method of operating the reactor the steps of cooling and reheating the reactor before the material growth on the reactor walls has reached a predetermined thickness. This thickness (as controlled by initial deposition time) is dependent upon the particular materials and is determined by the point at which the material layer formed on the wall will shatter and peel off the reactor walls without disturbing the reactor walls.

For the growth of silicon in a quartz reactor, for example, the reactor is cooled before the silicon layer from the initial deposition reaches 20 mils, and preferably before the silicon layer reaches 2 mils in thickness. If the initial deposition (hot reactor) time is, for example, between 30–90 minutes (depending on deposition conditions), the silicon material deposited on the quartz wall will reach a maximum thickness of about 1 mil. The cooling step will result in shattering of the thin silicon, hence a weak foundation for subsequent silicon deposition which keeps peeling continuously while the reactor is then maintained in a deposition mode.

Still further objects and advantages of the invention will become apparent from the detailed description and claims and from the accompanying drawing wherein the FIGURE is a cutaway view of a quartz fluidized bed reactor which is utilized in conjunction with an embodiment of the method of the present invention.

Referring now to this drawing, a fluidized bed reactor 10 is comprised of a vertically disposed cylindrical or tubular reactor chamber 11 with a conical bottom 28 provided with inlet 29 for entrance of reactant fluidizing gas. An inlet 13 is provided for introduction of silicon seed particles. The reaction by-product gases are removed from the reactor through the outlet 30. The cylindrical reactor chamber 11 is heated by heater coils 12 to provide a heated reaction zone. For the production of silicon material, silane, a silicon halide, particularly a chloride, bromide, or iodide, and/or a halosilane, is reacted in the vapor phase within the reaction zone in the presence of nucleating silicon particles 25 maintained therein in fluidized supension with, in a preferred embodiment, a reducing agent such as hydrogen.

In a more specific embodiment, a mixture of trichlorosilane ($HSiCl_3$) and silicon tetrachloride ($SiCl_4$) is continuously reacted with hydrogen ($H_2$) in the reaction zone maintained at temperatures ranging from about 950°–1250° C by charging the vaporized chlorosilanes into the bed of pure silicon seed particle 25 maintained in fluidized state in the zone by the hydrogen whereby elemental silicon formed in the reaction deposits on the seed particles. As described in co-pending patent application Ser. No. 469,179 filed May 13, 1974, by Gene Felix Wakefield et al, entitled "Method of Silicon Production" which patent application is assigned to the assignee of the present invention, in a preferred fluidized bed reaction, the mole ratio of hydrogen to trichlorosilane and/or silicon tetrachloride being between 7:1 and 1:1. The ratio of the trichlorosilane and silicon tetrachloride is preferably between 4:1 and 1:1.

The resulting silicon product in the form of particles larger in size than the nucleating particles overcome the force of the fluid stream, drop to the bottom of the reactor chamber 11, and are removed from outlet 24 by, for example, suction means. If the particles are maintained in an inert atmosphere as they are removed, the particles will be uncontaminated and may be added directly to a melt from which monocrystalline or polycrystalline rods are pulled.

The process is continuous by the addition of additional silicon seed particles as the larger particles which drop to the bottom are removed. The reaction is effected by a continuous stream of the mixture of silicon tetrachloride and/or trichlorosilane in hydrogen charged into the reaction zone as the additional elemental silicon seed particles enter the reaction zone. The flow rate of the reactant stream is 0.3 to 1.5 liters per minute per cm$^2$ of reactor cross-sectional area, i.e., preferably between 10–50 liters per minute for a chamber 11 diameter of 3 inches. An effluent stream of the unreacted gases and reaction by-products (HCl) are removed from the reactor via outlet 30.

The apparatus shown in the FIGURE is utilized in accordance with an embodiment of the present invention as follows. The reactor is purged with argon through inlet 14. The bed is maintained with argon through inlet 14 until the reactor is brought up to deposition temperature (850°–1350° C and preferably 950°–1250° C). Once the reactor is maintained at deposition temperature, the argon stream is gradually changed over to the reactant stream SiCl$_4$ and/or HSiCl$_3$ + H$_2$ and deposition begins. The reactor is left in the deposition mode for approximately 30–90 minutes or until the layer of silicon depositing on the reactor walls reaches a thickness of preferably between 0.5 and 2 mils. When this thickness of material has deposited on the walls, the reactant gas stream is gradually turned over to argon and the heater turned off to cool the reactor to a temperature between room temperature and 600° C. This will result in the shattering and peeling of the thin silicon layer without breaking the reactor. The heater is again turned on to bring the reactor to deposition temperature and a gradual change-over from argon to reactant gases after the deposition temperature is reached. The deposition process is then carried out continuously as long as desired. In the continuous mode, new seed particles are added through inlet 13 while particles with sufficient growth of silicon are removed through outlet 24.

Although the method of the present invention has been described in a particular embodiment for the production of silicon in a quartz fluidized bed reactor, it should be noted that the process is applicable to other fluidized bed reactor systems for the deposition of other materials where there is a relatively large difference between the coefficient of temperature expansion between such deposited material and the reactor wall material which would otherwise cause breakage of the reactor due to its increased susceptibility to thermal shock. The cycle time which controls the thickness of the material deposited upon the reactor wall during the initial deposition step will vary as the tolerable thickness for different materials will vary.

The method according to the present invention may also be utilized in reactors other than the fluidized bed reactor although, in the filament type reactor, for example, the need is not so great since the reactor walls are maintained at a much lower temperature than the temperature maintained in the fluidized bed reactor, where it is desirable to maintain the entire bed at deposition temperature.

Since it is obvious that many changes and modifications can be made in the above-described details without departing from the nature and spirit of the invention, it is understood that the invention is not to be limited to said details except as set forth in the appended claims.

What is claimed:

1. A method of operating a quartz wall fluidized bed deposition reactor for depositing silicon on a bed of silicon seed particles comprising the steps of:

forming a bed of silicon seed particles in said reactor;
   charging said reactor with an inert gas stream;
   heating said reactor to a deposition temperature between 950°–1250° C;
   gradually removing said inert gas stream and charging said reactor with a gaseous reactant stream comprised of silicon chloride and/or a chlorosilane, said reactant stream maintaining said particles in fluidized suspension;
   maintaining said deposition temperature for a predetermined length of time, whereby deposition of said silicon material on said quartz wall does not exceed a thickness of 2 mils;
   gradually removing said reactant stream and charging said reactor with said inert gas;
   cooling said reactor to a temperature between 30–600° C whereby silicon material deposited on said quartz reactor wall shatters and peels from said wall;
   reheating said reactor to said deposition temperature;
   again gradually removing said inert gas stream and charging said reactor with said gaseous reactant stream; and charging said reactor with said gaseous reactant stream;
   maintaining said deposition temperature; and
   continuously adding new silicon particles to said bed while removing from said reactor larger silicon particles upon which sufficient silicon material is deposited without reactor breakage.

2. The method according to claim 1 wherein said inert gas is argon.

3. The method according to claim 1 wherein said predetermined time is between 30–90 minutes.

* * * * *